March 27, 1934.  D. W. RUDORFF  1,952,896

TUBULAR MEMBER FOR HEAT EXCHANGERS

Filed April 28, 1932

INVENTOR
Dagobert W. Rudorff
BY
ATTORNEY

Patented Mar. 27, 1934

1,952,896

UNITED STATES PATENT OFFICE 1,952,896

TUBULAR MEMBER FOR HEAT EXCHANGERS

Dagobert W. Rudorff, New York, N. Y., assignor to The Superheater Company, New York, N. Y.

Application April 28, 1932, Serial No. 608,011

4 Claims. (Cl. 257—262)

The present invention relates to tubular members for heat exchangers having extension pieces thereon for increasing the area of contact with the medium surrounding them.

It is known to provide the tubes of economizers, and other forms of heat exchangers, with means for increasing the gas touched area above that furnished by tubes of ordinary form. Tubes having such extended surfaces have considerable economic advantage in cases where the tubes have liquid in contact with their inner surfaces and gases in contact with their outer surfaces. In such extended surface tubes, however, difficulty has been encountered at times in obtaining good heat transfer from the extended surface means to the wall of the tube proper.

It is the principal object of my invention to provide an arrangement for minimizing such difficulty.

The novel features of my invention are pointed out in the appended claims. In order, however, that the invention, together with its objects and advantages, may be clearly and readily understood, I will now describe by way of example and in connection with the accompanying drawing two forms of tubes having extended surfaces thereon and which are selected from a number of possible embodiments of my invention. In the drawing, Fig. 1 is a transverse sectional view of a tubular conduit having extended surface means associated therewith in accordance with my invention.

Figure 1:
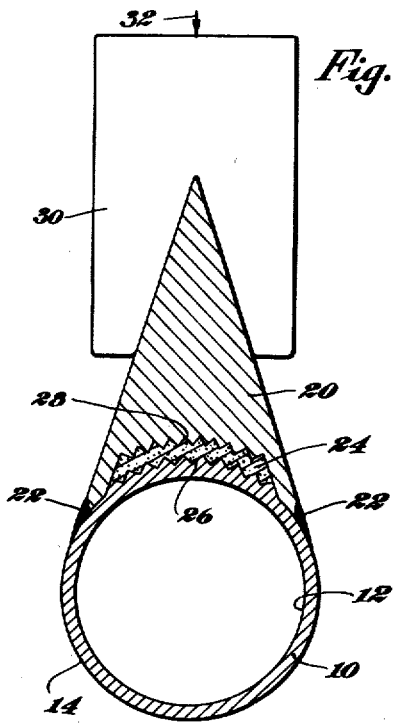
Figure 4:
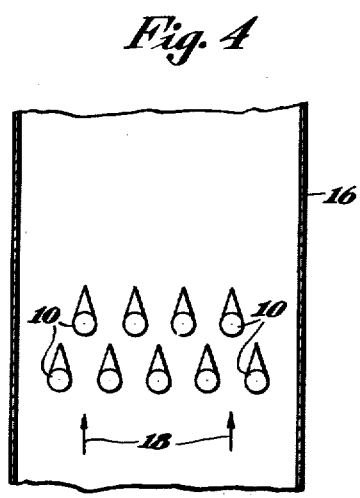
Fig. 4 is a diagrammatic view of a portion of a heat exchanger employing tubes in accordance with my invention.

Referring to the drawing more in detail, I have illustrated in Fig. 1 a tubular conduit 10, the inner surface 12 of which is expected in use to contact with a liquid flowing through the conduit. The exterior surface 14 of the conduit 10 is expected when in use to be in contact with a gaseous fluid. Such relationship is illustrated more in detail in the apparatus illustrated on a small scale in Fig. 4 in which a plurality of members 10, 10 are shown assembled in a duct 16 through which a current of gas is assumed to be flowing in the direction indicated by the arrows 18, 18.

In order to increase the surface of the tubular member 10 in contact with the gas stream, I have shown associated with such member a surface extending means comprising a longitudinal member 20 which will be understood to extend longitudinally of member 10 parallel to its central axis. As illustrated, member 20 has a triangular cross section, but I do not limit myself to this. Preferably the cross section of the combined unit composed of members 10 and 20 has a cross section approximately bounded by the stream line curves, but I do not limit myself to this. The member 20 is shown as fastened to the outer surface of member 10 by means of bodies of weld metal 22, 22 running along the two edges of the member 20 formed by its inner surface and its outer surfaces. The members 10 and 20 being separate pieces, the contact between them offers considerable resistance to the flow of heat from one to the other and, in order to reduce such resistance, I have shown between such two members a third piece 24. The function of the piece 24 is to increase the transfer of heat from member 20 to member 10 and it must be made of suitable material for this purpose. Preferably, the coefficient of thermal expansion of the material of member 24 should be higher than that of the material forming members 10 and 20 so that, when the parts are heated in use, the part 24 shall swell more rapidly than the chamber within which it lies and thereby produce a high pressure between the parts to promote transfer of heat from one to the other. Member 24 should also have good heat conductivity.

In order to promote heat transfer from member 20 to member 10 I preferably corrugate a considerable portion of the surfaces of such members to thereby increase the area of the surface across which the transfer of heat may occur. In Fig. 1, I have shown member 10 as having corrugations 26 and member 20 as having corrugations 28, such sets of corrugations being in contact with the intermediate piece 24. The corrugations 26 and 28 can be formed by any suitable method such as pressing the parts with a die while hot, grooving them with a milling cutter, or rolling them while hot with a corrugated roller. Of course, it is necessary when an intermediate piece 24 is used with members 10 and 20 which have corrugations that the piece 24 have corrugations which fit closely the corrugations 26 and 28. The piece 24 can be corrugated by heating it and pressing it between parts 10 and 20 after corrugations 26 and 28 have been formed thereon. However, I do not limit myself to this. It is within my invention to omit the piece 24 so as to bring the corrugations 26 and 28 into direct contact, the increase in the rate of heat transfer being effected only by the increase in surface resulting from corrugating the pieces. In this case, corrugations 28 must be exactly complemental to corrugations 26.

In either case, it is desirable to assemble the parts under pressure before applying the bodies of weld metal 22 and such method of assembly is indicated diagrammatically in Fig. 1 by a block 30 which contacts with the outer face of part 20 to force it against the tube 10 during the welding operation, the direction of pressure being indicated by the arrow 32.

It is within my invention to omit the corrugations 26 and 28, or either of them, and to rely upon the intermediate piece 24 for increasing the heat conductivity between parts 10 and 20.

Figure 2:
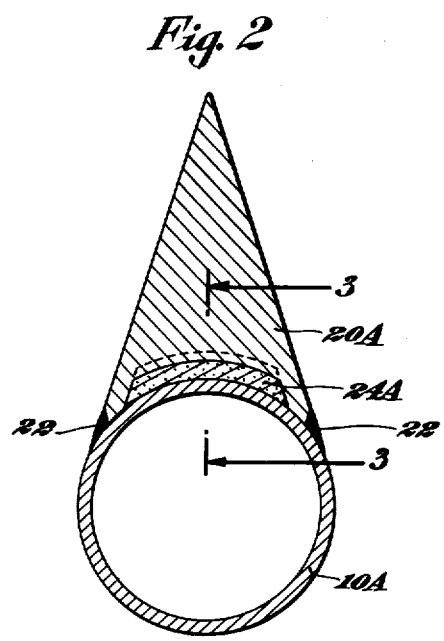
Fig. 2 is a view similar to Fig. 1 of a second form of the invention.
Figure 3:
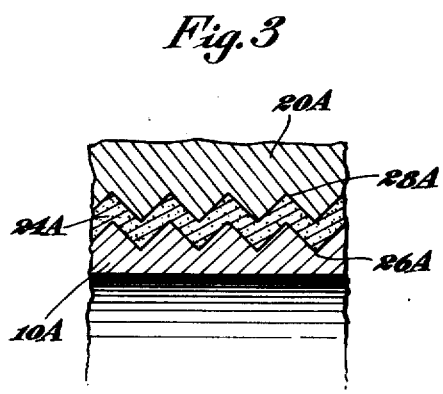
Fig. 3 is a section on the line 3—3 of Fig. 2.

The embodiment of the invention illustrated in Figs. 2 and 3 is similar to that of Fig. 1 except that in Figs. 2 and 3 members 10a and 20a are substituted for the members 10 and 20, members 10a and 20a having corrugations 26a and 28a respectively which are transverse to the axis of the tubular member 10a instead of parallel to such axis. In the form shown in Figs. 2 and 3 an intermediate piece 24a is employed, the material composing which should have the same characteristics as that of material composing piece 24. In the tubes 10 and 10A the corrugations do not extend within the cylindrical surface corresponding to the ordinary surface of the tubes. This is important as to tube 10 because the corrugations extend longitudinally and otherwise would weaken the tube as to internal pressures. The depth of corrugations on tube 10A is shown the same as that of the corrugations on tube 10 but I do not limit myself to this. Any suitable method may be used for thickening the walls of tubes 10 and 10A over the areas on which it is desired to form corrugations 26 and 26A. One such method is to heat the tubes and to press them between dies whose outer surfaces are complemental to the desired shape. However, I do not limit myself to this.

While I have shown the members 20 and 20a for increasing the contact surface of the tubes 10 and 10a both as of the longitudinal type, I do not restrict my invention to longitudinally extending members, but may employ it also with extended surface members of the circumferential type.

Materials particularly well adapted for use in forming members such as 24 and 24a are aluminum, copper, lead and zinc. However, I do not limit myself to these materials. Ordinarily also, members 10 and 20 are of steel or iron, but I do not limit myself in this respect.

What I claim is:

1. The combination of a tube, an extension piece on said tube, said tube and piece having a conformation providing a chamber therebetween, a piece of metal in said chamber, whose coefficient of thermal expansion is higher than that of the metal of said extension piece, and means for holding said parts in good heat transferring relation.

2. The combination of a tube having corrugations on a portion of its outer surface, an extension piece arranged on said corrugated portion and having corrugations on a portion of its inner surface facing the corrugations on said tube, a piece of metal intermediate said tube and extension piece, whose coefficient of thermal expansion is higher than that of the metal of said extension piece and which has corrugations fitting closely those of the tube and extension piece, and means for holding said extension piece of metal and said tube in good heat transferring relation.

3. The combination of a tube, an extension piece on said tube, said tube and extension piece having a conformation providing a chamber therebetween, a piece of metal in said chamber whose coefficient of thermal expansion is higher than that of said extension piece, and bodies of weld metal for uniting the edges of said extension piece to said tube, said extension piece separating said chamber and said bodies.

4. The combination of a metal tube having corrugations on a portion of its outer surface, and a metal extension piece arranged on said corrugated portion and having corrugations on a portion of its inner surface facing the corrugations on said tube, and means for holding said corrugated portions in good heat transferring relation.

DAGOBERT W. RUDORFF.

CERTIFICATE OF CORRECTION.

Patent No. 1,952,896.      March 27, 1934.

DAGOBERT W. RUDORFF.

It is hereby certified that error appears in the printed specification of the above numbered patent requiring correction as follows: Page 2, line 98, claim 2, after "and" insert said; and in line 103, after "piece" insert the comma and words , said piece; and that the said Letters Patent should be read with these corrections therein that the same may conform to the record of the case in the Patent Office.

Signed and sealed this 15th day of May, A. D. 1934.

Bryan M. Battey (Seal)      Acting Commissioner of Patents.

the rate of heat transfer being effected only by the increase in surface resulting from corrugating the pieces. In this case, corrugations 28 must be exactly complemental to corrugations 26.

In either case, it is desirable to assemble the parts under pressure before applying the bodies of weld metal 22 and such method of assembly is indicated diagrammatically in Fig. 1 by a block 30 which contacts with the outer face of part 20 to force it against the tube 10 during the welding operation, the direction of pressure being indicated by the arrow 32.

It is within my invention to omit the corrugations 26 and 28, or either of them, and to rely upon the intermediate piece 24 for increasing the heat conductivity between parts 10 and 20.

The embodiment of the invention illustrated in Figs. 2 and 3 is similar to that of Fig. 1 except that in Figs. 2 and 3 members 10a and 20a are substituted for the members 10 and 20, members 10a and 20a having corrugations 26a and 28a respectively which are transverse to the axis of the tubular member 10a instead of parallel to such axis. In the form shown in Figs. 2 and 3 an intermediate piece 24a is employed, the material composing which should have the same characteristics as that of material composing piece 24. In the tubes 10 and 10A the corrugations do not extend within the cylindrical surface corresponding to the ordinary surface of the tubes. This is important as to tube 10 because the corrugations extend longitudinally and otherwise would weaken the tube as to internal pressures. The depth of corrugations on tube 10A is shown the same as that of the corrugations on tube 10 but I do not limit myself to this. Any suitable method may be used for thickening the walls of tubes 10 and 10A over the areas on which it is desired to form corrugations 26 and 26A. One such method is to heat the tubes and to press them between dies whose outer surfaces are complemental to the desired shape. However, I do not limit myself to this.

While I have shown the members 20 and 20a for increasing the contact surface of the tubes 10 and 10a both as of the longitudinal type, I do not restrict my invention to longitudinally extending members, but may employ it also with extended surface members of the circumferential type.

Materials particularly well adapted for use in forming members such as 24 and 24a are aluminum, copper, lead and zinc. However, I do not limit myself to these materials. Ordinarily also, members 10 and 20 are of steel or iron, but I do not limit myself in this respect.

What I claim is:

1. The combination of a tube, an extension piece on said tube, said tube and piece having a conformation providing a chamber therebetween, a piece of metal in said chamber, whose coefficient of thermal expansion is higher than that of the metal of said extension piece, and means for holding said parts in good heat transferring relation.

2. The combination of a tube having corrugations on a portion of its outer surface, an extension piece arranged on said corrugated portion and having corrugations on a portion of its inner surface facing the corrugations on said tube, a piece of metal intermediate said tube and extension piece, whose coefficient of thermal expansion is higher than that of the metal of said extension piece and which has corrugations fitting closely those of the tube and extension piece, and means for holding said extension piece of metal and said tube in good heat transferring relation.

3. The combination of a tube, an extension piece on said tube, said tube and extension piece having a conformation providing a chamber therebetween, a piece of metal in said chamber whose coefficient of thermal expansion is higher than that of said extension piece, and bodies of weld metal for uniting the edges of said extension piece to said tube, said extension piece separating said chamber and said bodies.

4. The combination of a metal tube having corrugations on a portion of its outer surface, and a metal extension piece arranged on said corrugated portion and having corrugations on a portion of its inner surface facing the corrugations on said tube, and means for holding said corrugated portions in good heat transferring relation.

DAGOBERT W. RUDORFF.

CERTIFICATE OF CORRECTION.

Patent No. 1,952,896.      March 27, 1934.

DAGOBERT W. RUDORFF.

It is hereby certified that error appears in the printed specification of the above numbered patent requiring correction as follows: Page 2, line 98, claim 2, after "and" insert said; and in line 103, after "piece" insert the comma and words , said piece; and that the said Letters Patent should be read with these corrections therein that the same may conform to the record of the case in the Patent Office.

Signed and sealed this 15th day of May, A. D. 1934.

Bryan M. Battey (Seal)      Acting Commissioner of Patents.